(12) United States Patent
Garrido

(10) Patent No.: US 6,419,619 B2
(45) Date of Patent: *Jul. 16, 2002

(54) CONTINUOUS SUBSTANCE-SEPARATING PROCEDURE IN THREE PHASES: LIQUID/LIQUID/NONSOLUBLE SOLIDS

(76) Inventor: Carlos R. Garrido, Las Pimpinelas 1853, Santiago (CL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,435

(22) Filed: Jul. 6, 1998

(51) Int. Cl.[7] .............................. B04B 3/04; B01D 17/038
(52) U.S. Cl. .................. 494/53; 494/55; 210/360.1; 210/377; 210/380.1; 210/380.3
(58) Field of Search .................. 210/360.1, 377, 210/380.1, 380.3; 404/27, 38, 53, 54, 55, 56

(56) References Cited

U.S. PATENT DOCUMENTS 4,313,559 A * 2/1982 Ostkamp et al. .............. 494/53
4,729,830 A * 3/1988 Suzuki ........................ 494/53
5,643,169 A * 7/1997 Leung et al. .................. 494/53

* cited by examiner

Primary Examiner—David A. Reifsnyder
(74) Attorney, Agent, or Firm—Shlesinger, Arkwright & Garvey LLP

(57) ABSTRACT

A continuous procedure for the separation of substances in three phases: liquid/liquid/nonsoluble solids, preferably to separate the organic contained in wastes from solvent extraction processes. The procedure is made up of a first stage of radial feeding of wastes coming from an axial section of a differential rotary field; wherein said differential rotary field is, made up of rotary means of solid dragging and of perimetral rotary means, which rotate in one and the same direction and with different angular speeds according to a spin axis which is substantially horizontal. A second stage consisting in a first radial adjustment of the separation zone of the liquid phases, wherein said first adjustment is carried out with annular means of radial adjustment, which are static with respect to said perimetral rotary means, acting as an overflow lip to allow the pass of the predominantly light liquid phase. A third stage consisting in a second radial adjustment of the level of the separation zone acting at the outlet of the liquid/liquid overflow of the second preceding stage.

6 Claims, 1 Drawing Sheet

CONTINUOUS SUBSTANCE-SEPARATING PROCEDURE IN THREE PHASES: LIQUID/LIQUID/NONSOLUBLE SOLIDS

BACKGROUND OF THE INVENTION

1. Field of the Invention

A continuous procedure for the separation of substances in three phases is presented, especially of the organic contained in wastes coming from the solvent extraction processes.

2. Description of the Related Art

A great number of procedures for the separation of the organic from wastes is known, but most of them include an initial stage of settling to separate solids, thus an emulsion being obtained for the liquid components, or crud, which mainly includes two phases: an aqueous phase and an organic solvent phase, wherein this organic phase is separated by different techniques of emulsion destabilization using a series of chemical reagents, in addition to mechanical breakdown operations basically consisting in inducing an increase in the volumetric ratio of the dispersoid in order to achieve a critical ratio determining the destabilization of the emulsion, the coalescence of the particles which were scattered, being thus started.

Depending on various factors, such as the type of mineral, the leaching process used in the extraction process applied, the crud from a plant generally has several degrees of stability and according to this, the suitable destabilization process therefor must be applied in order to achieve a maximum recovery of solvent. The stability of crud depends on organic:acqueous and acqueous:organic emulsion ratio, the latter being the most unstable component.

SUMMARY OF THE INVENTION

In the procedure of the invention, on the contrary, the previous obtainment of crud is not required, thus allowing the direct processing of wastes, avoiding the usual stages of settling used to previously separate solids. This procedure is really a continuous three-phase separation: solid phase, light liquid phase (organic solvent), and heavy liquid phase (aqueous). The procedure makes use of the "gravity" principle for separating liquids; more accurately said, it considers the application of several "Gs" to the particles to be separated (typically 2,000 G).

If the separation of three phases, light-liquid/heavy-liquid plus nonsoluble solids, is necessary, the centrifugal separators shall be operated in batches, since the nonsoluble solids saturate the solid chamber of this kind of devices. The procedure of the invention, on the contrary, allows a continuous separation of substances in three phases: light-liquid/heavy-liquid plus nonsoluble solids, allowing the continuous discharge of solids out of the system.

On the other hand, the conventional procedures and equipments cannot dynamically control the separation zone of light-liquid/heavy-liquid phases, the process having to be suspended in order to carry out the phase selectivity adjustments. This kind of control is not practical when substances are to be processed, which phase compositions are constantly changing. The invention, on the contrary, allows a dynamic control of the light-liquid/heavy-liquid separation zone through the radial variation of centripetal means at the outlet of the heavy liquid phase.

Due to the characteristics of the procedure of the invention, as it will be explained in greater detail hereinbelow, this allows the separation of a very wide range of wastes, from those in which nonsoluble solids present a specific weight greater than the organic and lower than the aqueous, to those in which the nonsoluble solids present specific weight greater than the organic and aqueous, being also able to process the wastes which are a combination of the two preceding types.

In order to better understand the process of the invention, the same will be described in greater detail through a preferred embodiment.

DETAILED DESCRIPTION OF THE INVENTION

Figure 1:
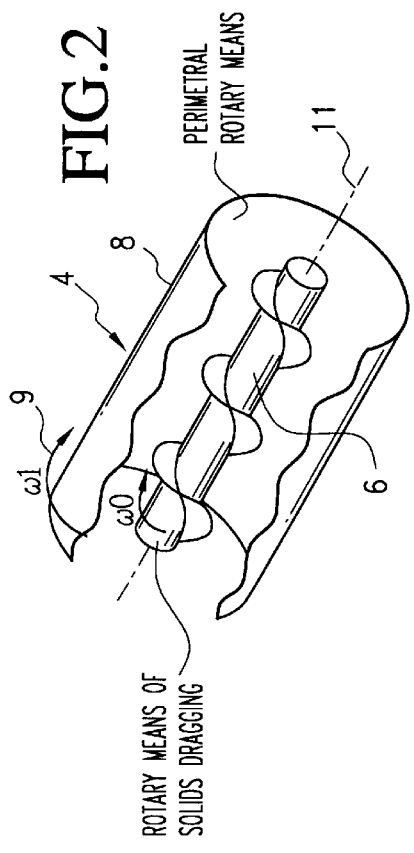
FIG. 1 is a schematic perspective view of radial feeding of crud to a differential rotary field.
Figure 2:
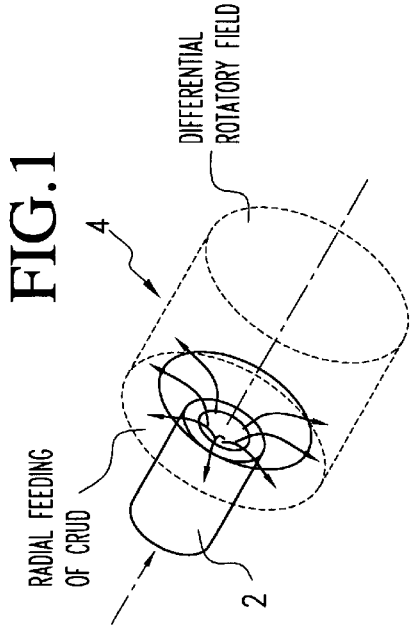
FIG. 2 is a schematic perspective view of a differential rotary field.
Figure 3:
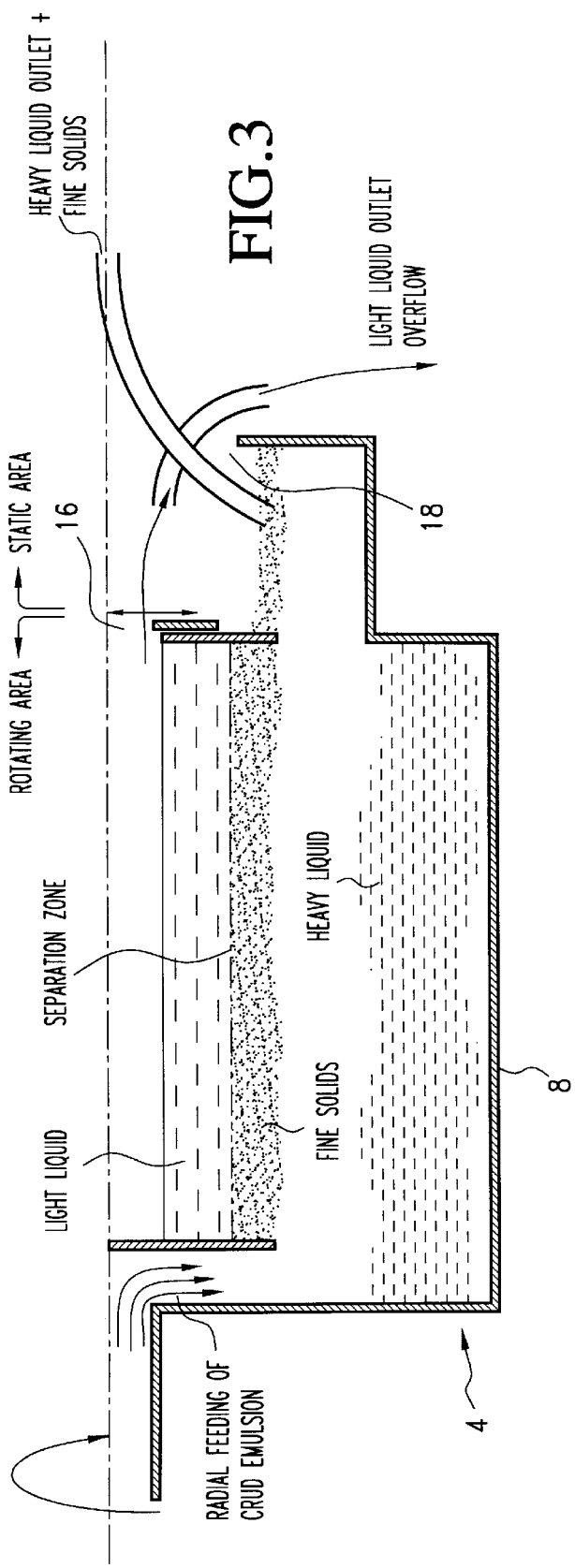
FIG. 3 is a cross-sectional view of a differential rotary field, showing the separation of nonsoluble solids, light liquid and heavy liquid.

This continuous substance-separating procedure in three phases, made up of two liquid phases plus a phase of nonsoluble solids, comprises a feeding stage 2 of a substantially laminar flow to the wastes to be processed, which axially enters the means defining a differential rotary field 4, made up of rotary means 6 for the dragging of solids, such as an axial scroll and perimetral rotary means 8, such as the housing of a tank. Both rotary means, that of solid dragging and the perimetral ones, rotate in one and the same direction 9 according to a spin axis 11 which is substantially horizontal and at different speeds $\omega 0$ and $\omega 1$, the perimetral rotary means being those which rotate at a lower angular speed preferably. This combination of rotations (of solid dragging and perimetral rotation) in the same direction, but with different angular values generate a differential rotary field in the wastes to be treated as shown in FIG. 3.

The feeding discharge into the differential rotary field 4 is carried out radially, but this feeding has been referred to as "axial", because the radial discharge is carried out from a central or axial section of the differential rotary field.

The procedure is complemented with three independent ways of discharge: one for nonsoluble solids and one for each one of the two types of typical liquids of process wastes: aqueous or heavy liquid and organic or light liquid. Each one of the discharge ways of liquids comprises radial adjusting means for the "level" of the corresponding liquid upon its discharge. In this rotary scheme, several "Gs" shall be understood as "level", at radial elevations, said levels being greater while greater the radius.

It shall be understood in general that liquid phases may contain suspended solids, with specific weights which are about the specific weight of the phase in which they are suspended. In this context, when reference is made to the separation of each of the liquid phases, it shall be understood that these possible suspended solids shall become incorporated to the corresponding already separated phases, unless mechanical retaining means have been considered to remove these solids before the phase-separating stages.

The adjusting means of the level of the separation zone of liquid phases are of two types. A first adjusting means 16 of the level of the separation zone is of the radial adjustment annular type and remains static with respect to the perimetral rotary means 8. This first adjusting means 16 of the level acts as an overflow lip for the light liquid phase, allowing the definition of the minimum level to assure that the light liquid phase does not exceed said overflow so that this light phase is free of contamination with portions of heavy phase, the last phase being able to instead to become contaminated with portions of the light phase. This first adjusting means 16 allows a transfer to the separation zone beyond the discharge of the light liquid. In order to exercise control on the heavy phase (and separate the same from the possible contamination with the light phase) which has been selected by the first adjusting means, the procedure considers a second adjusting means 18 of the level of the separation zone consisting in centripetal driving means of radial adjustment, which speed up the liquid found from the level determined by the adjustment of these second means from high overflow level to a lower one, thus its inlet pressure being increased. The remaining light-liquid/heavy-liquid which has not exceeded this second overflow shall interact at the level of the first overflow, the first radial adjustment of the separation zone having to be corrected, depending on which phase is the priority in the process.

Thanks to the control of the process which can be exercised through the adjustment means of level of the separation zone, as limit cases the adjustment of parameters can be considered, so that, for example, a light liquid phase completely "contaminated" with the heavy liquid phase is obtained, that is, that the procedure causes only the separation between the solid phase and the liquid phase (light liquid plus heavy liquid), or, on the contrary, a heavy liquid phase completely "contaminated" with the light liquid phase is obtained. This particular situation may become useful in order to use the procedure as a high performance settling, especially applicable when the facility to be predominantly used as a three phase separator is available and, occasionally, when said high performance settling is required without the investment in additional equipments or facilities being necessary.

Since the rotation speeds of the rotary means for the dragging of solids and the perimetral rotary means are different, the procedure considers the control of the angular speed of these last means, and the control of the differences of angular speeds. By exercising the control on the rotation differences, instead of the direct control of the second rotation (draggings means of solids), the reverse dragging of solids is avoided, the same being accrued inside the system.

What is claimed is:

1. A method for the continuous separation of emulsion into light liquid, heavy liquid and nonsoluble solids phases to separate organic substances in waste generated by solvent extraction processes, comprising:

radial feeding the waste at one end into an axial section of a differential rotary field having a substantially horizontal axis, rotary dragging means and perimetral rotary means rotating with a different angular speed and in the same direction as the rotary dragging means whereby the waste is separated into the heavy liquid, nonsoluble solids and light liquid separations zones disposed at periphery, intermediate and axial zones, respectively, in the differential rotary field;

providing a first radial annular adjustment means for the level of the light liquid phase separation zone, the first radial annular adjustment means being static with respect to the perimetral rotary means, the first radial annular adjustment means acting as an overflow outlet lip to allow the flow of the light liquid phase out of the differential rotary field;

providing a second radial adjustment means for the level of the heavy liquid separation zone, the second radial adjustment means acting as an overflow outlet for the heavy liquid phase at the center of the perimetral rotary means;

discharging the light liquid phase through the first radial annular adjustment means;

discharging the heavy liquid phase through the second radial adjustment means at the center of the perimetral rotary means; and discharging the nonsoluble solids phase at the other end of the rotary dragging means.

2. A method as in claim 1, wherein the rotary dragging means is a screw conveyor.

3. A method as in claim 2, and further comprising:

adjusting the first and second radial adjustment means to adjust the levels of the separation zones such that a light liquid phase completely "contaminated" with the heavy liquid phase is obtained, whereby only the separation between the non-soluble solids phase and the light and heavy liquid phases is produced.

4. A method as in claim 2, and further comprising:

adjusting the first and second radial adjustment means to adjust the levels of the separation zones such that a heavy liquid phase completely "contaminated" with the light liquid phase is obtained, whereby only the separation between the non-soluble solids phase and the light and heavy liquid phases is produced.

5. A method as in claim 1, and further comprising:

adjusting the first and second radial adjustment means to adjust the levels of the separation zones such that a light liquid phase completely "contaminated" with the heavy liquid phase is obtained, whereby only the separation between the non-soluble solids phase and the light and heavy liquid phase is produced.

6. A method as in claim 1, and further comprising:

adjusting the first and second radial adjustment means to adjust the levels of the separation zones such that a heavy liquid phase completely "contaminated" with the light liquid phase is obtained, whereby only the separation between the non-soluble solids phase and the light and heavy liquid phases is produced.

* * * * *